US010718624B2

(12) United States Patent
Johnson et al.

(10) Patent No.: US 10,718,624 B2
(45) **Date of Patent: *Jul. 21, 2020**

(54) VEHICULAR PARKING ASSIST SYSTEM THAT DETERMINES A PARKING SPACE BASED IN PART ON PREVIOUSLY PARKED SPACES

(71) Applicant: MAGNA ELECTRONICS INC., Auburn Hills, MI (US)

(72) Inventors: Nathaniel S. Johnson, Royal Oak, MI (US); Paul A. VanOphem, Washington, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/291,008

(22) Filed: Mar. 4, 2019

(65) Prior Publication Data

US 2019/0195647 A1 Jun. 27, 2019

Related U.S. Application Data

(60) Continuation of application No. 15/130,130, filed on Apr. 15, 2016, now Pat. No. 10,222,224, which is a division of application No. 14/303,695, filed on Jun. 13, 2014, now abandoned.

(60) Provisional application No. 61/838,619, filed on Jun. 24, 2013.

(51) Int. Cl.

*G01C 21/36* (2006.01)
*G08G 1/14* (2006.01)
*B60R 25/102* (2013.01)
*G08G 1/00* (2006.01)

(Continued)

(52) U.S. Cl.

CPC ............ *G01C 21/36* (2013.01); *B60R 25/102* (2013.01); *G08B 25/009* (2013.01); *G08G 1/143* (2013.01); *G08G 1/147* (2013.01); *G08G 1/205* (2013.01); *G08B 13/19647* (2013.01); *G08B 13/19697* (2013.01)

(58) Field of Classification Search

CPC ......... G08G 1/143; G08G 1/145; G08G 1/147

See application file for complete search history.

(56) References Cited

U.S. PATENT DOCUMENTS 4,720,790 A 1/1988 Miki et al.
4,987,357 A 1/1991 Masaki
4,991,054 A 2/1991 Walters (Continued)

*Primary Examiner* — Hongmin Fan
(74) *Attorney, Agent, or Firm* — Honigman LLP

(57) ABSTRACT

A vehicular parking assist system includes a location sensor disposed at a vehicle that at least in part determines a current geographical location of the vehicle. An ECU is disposed in the vehicle and stores a database of parking space locations where the vehicle has previously been parked. The vehicular parking assist system receives wireless communications from a remote server pertaining to parking spaces at or near the current geographical location of the vehicle. Responsive at least in part to (i) an output of the location sensor, (ii) the stored database of parking space locations where the vehicle has previously been parked and (iii) the received wireless communications from the remote server, the vehicular parking assist system determines a likelihood of finding an empty parking space at or near the current geographical location of the vehicle.

30 Claims, 5 Drawing Sheets

14b
10
14c
16
18
20
14d
12
14a

(51) Int. Cl.
*G08B 25/00* (2006.01)
*G08B 13/196* (2006.01)

(56) References Cited

U.S. PATENT DOCUMENTS 5,001,558 A 3/1991 Burley et al.
5,003,288 A 3/1991 Wilhelm
5,012,082 A 4/1991 Watanabe
5,016,977 A 5/1991 Baude et al.
5,027,001 A 6/1991 Torbert
5,027,200 A 6/1991 Petrossian et al.
5,044,706 A 9/1991 Chen
5,055,668 A 10/1991 French
5,059,877 A 10/1991 Teder
5,064,274 A 11/1991 Alten
5,072,154 A 12/1991 Chen
5,073,012 A 12/1991 Lynam
5,076,673 A 12/1991 Lynam et al.
5,086,253 A 2/1992 Lawler
5,096,287 A 3/1992 Kakinami et al.
5,097,362 A 3/1992 Lynas
5,115,346 A 5/1992 Lynam
5,121,200 A 6/1992 Choi
5,124,549 A 6/1992 Michaels et al.
5,130,709 A 7/1992 Toyama et al.
5,148,014 A 9/1992 Lynam et al.
5,151,816 A 9/1992 Varaprasad et al.
5,168,378 A 12/1992 Black
5,170,374 A 12/1992 Shimohigashi et al.
5,172,235 A 12/1992 Wilm et al.
5,177,685 A 1/1993 Davis et al.
5,182,502 A 1/1993 Slotkowski et al.
5,184,956 A 2/1993 Langlais et al.
5,189,561 A 2/1993 Hong
5,193,000 A 3/1993 Lipton et al.
5,193,029 A 3/1993 Schofield et al.
5,204,778 A 4/1993 Bechtel
5,208,701 A 5/1993 Maeda
5,245,422 A 9/1993 Borcherts et al.
5,253,109 A 10/1993 O'Farrell et al.
5,255,442 A 10/1993 Schierbeek et al.
5,276,389 A 1/1994 Levers
5,285,060 A 2/1994 Larson et al.
5,289,182 A 2/1994 Brillard et al.
5,289,321 A 2/1994 Secor
5,305,012 A 4/1994 Faris
5,307,136 A 4/1994 Saneyoshi
5,309,137 A 5/1994 Kajiwara
5,313,072 A 5/1994 Vachss
5,325,096 A 6/1994 Pakett
5,325,386 A 6/1994 Jewell et al.
5,329,206 A 7/1994 Slotkowski et al.
5,331,312 A 7/1994 Kudoh
5,336,980 A 8/1994 Levers
5,341,437 A 8/1994 Nakayama
5,351,044 A 9/1994 Mathur et al.
5,355,118 A 10/1994 Fukuhara
5,374,852 A 12/1994 Parkes
5,386,285 A 1/1995 Asayama
5,394,333 A 2/1995 Kao
5,406,395 A 4/1995 Wilson et al.
5,406,414 A 4/1995 O'Farrell et al.
5,410,346 A 4/1995 Saneyoshi et al.
5,414,257 A 5/1995 Stanton
5,414,461 A 5/1995 Kishi et al.
5,416,313 A 5/1995 Larson et al.
5,416,318 A 5/1995 Hegyi
5,416,478 A 5/1995 Morinaga
5,424,952 A 6/1995 Asayama
5,426,294 A 6/1995 Kobayashi et al.
5,430,431 A 7/1995 Nelson
5,434,407 A 7/1995 Bauer et al.
5,440,428 A 8/1995 Hegg et al.
5,444,478 A 8/1995 Lelong et al.
5,451,822 A 9/1995 Bechtel et al.
5,457,493 A 10/1995 Leddy et al.
5,461,357 A 10/1995 Yoshioka et al.
5,461,361 A 10/1995 Moore
5,469,298 A 11/1995 Suman et al.
5,471,515 A 11/1995 Fossum et al.
5,475,494 A 12/1995 Nishida et al.
5,497,306 A 3/1996 Pastrick
5,498,866 A 3/1996 Bendicks et al.
5,500,766 A 3/1996 Stonecypher
5,510,983 A 4/1996 Lino
5,515,448 A 5/1996 Nishitani
5,521,633 A 5/1996 Nakajima et al.
5,528,698 A 6/1996 Kamei et al.
5,529,138 A 6/1996 Shaw et al.
5,530,240 A 6/1996 Larson et al.
5,530,420 A 6/1996 Tsuchiya et al.
5,535,314 A 7/1996 Alves et al.
5,537,003 A 7/1996 Bechtel et al.
5,539,397 A 7/1996 Asanuma et al.
5,541,590 A 7/1996 Nishio
5,550,677 A 8/1996 Schofield et al.
5,555,555 A 9/1996 Sato et al.
5,568,027 A 10/1996 Teder
5,574,443 A 11/1996 Hsieh
5,581,464 A 12/1996 Woll et al.
5,594,222 A 1/1997 Caldwell
5,610,756 A 3/1997 Lynam et al.
5,614,788 A 3/1997 Mullins
5,619,370 A 4/1997 Guinosso
5,632,092 A 5/1997 Blank et al.
5,634,709 A 6/1997 Iwama
5,642,299 A 6/1997 Hardin et al.
5,648,835 A 7/1997 Uzawa
5,650,944 A 7/1997 Kise
5,660,454 A 8/1997 Mori et al.
5,661,303 A 8/1997 Teder
5,666,028 A 9/1997 Bechtel et al.
5,670,935 A 9/1997 Schofield et al.
5,677,851 A 10/1997 Kingdon et al.
5,699,044 A 12/1997 Van Lente et al.
5,724,316 A 3/1998 Brunts
5,732,379 A 3/1998 Eckert et al.
5,737,226 A 4/1998 Olson et al.
5,760,828 A 6/1998 Cortes
5,760,931 A 6/1998 Saburi et al.
5,760,962 A 6/1998 Schofield et al.
5,761,094 A 6/1998 Olson et al.
5,765,116 A 6/1998 Wilson-Jones et al.
5,765,118 A 6/1998 Fukatani
5,781,437 A 7/1998 Wiemer et al.
5,786,772 A 7/1998 Schofield et al.
5,790,403 A 8/1998 Nakayama
5,790,973 A 8/1998 Blaker et al.
5,793,308 A 8/1998 Rosinski et al.
5,793,420 A 8/1998 Schmidt
5,796,094 A 8/1998 Schofield et al.
5,835,255 A 11/1998 Miles
5,837,994 A 11/1998 Stam et al.
5,844,505 A 12/1998 Van Ryzin
5,844,682 A 12/1998 Kiyomoto et al.
5,845,000 A 12/1998 Breed et al.
5,848,802 A 12/1998 Breed et al.
5,850,176 A 12/1998 Kinoshita et al.
5,850,254 A 12/1998 Takano et al.
5,867,591 A 2/1999 Onda
5,877,707 A 3/1999 Kowalick
5,877,897 A 3/1999 Schofield et al.
5,878,357 A 3/1999 Sivashankar et al.
5,878,370 A 3/1999 Olson
5,883,739 A 3/1999 Ashihara et al.
5,884,212 A 3/1999 Lion
5,890,021 A 3/1999 Onoda
5,896,085 A 4/1999 Mori et al.
5,899,956 A 5/1999 Chan
5,915,800 A 6/1999 Hiwatashi et al.
5,923,027 A 7/1999 Stam et al.
5,924,212 A 7/1999 Domanski
5,929,786 A 7/1999 Schofield et al.
5,949,331 A 9/1999 Schofield et al.

(56) References Cited

U.S. PATENT DOCUMENTS 5,959,555 A 9/1999 Furuta
5,963,247 A 10/1999 Banitt
5,986,796 A 11/1999 Miles
5,990,469 A 11/1999 Bechtel et al.
5,990,649 A 11/1999 Nagao et al.
6,020,704 A 2/2000 Buschur
6,049,171 A 4/2000 Stam et al.
6,066,933 A 5/2000 Ponziana
6,084,519 A 7/2000 Coulling et al.
6,097,023 A 8/2000 Schofield et al.
6,097,024 A 8/2000 Stam et al.
6,144,022 A 11/2000 Tenenbaum et al.
6,175,300 B1 1/2001 Kendrick
6,178,034 B1 1/2001 Allemand et al.
6,198,409 B1 3/2001 Schofield et al.
6,201,642 B1 3/2001 Bos
6,222,447 B1 4/2001 Schofield et al.
6,223,114 B1 4/2001 Boros et al.
6,227,689 B1 5/2001 Miller
6,250,148 B1 6/2001 Lynam
6,266,082 B1 7/2001 Yonezawa et al.
6,266,442 B1 7/2001 Laumeyer et al.
6,285,393 B1 9/2001 Shimoura et al.
6,294,989 B1 9/2001 Schofield et al.
6,297,781 B1 10/2001 Turnbull et al.
6,302,545 B1 10/2001 Schofield et al.
6,310,611 B1 10/2001 Caldwell
6,313,454 B1 11/2001 Bos et al.
6,317,057 B1 11/2001 Lee
6,320,176 B1 11/2001 Schofield et al.
6,320,282 B1 11/2001 Caldwell
6,333,759 B1 12/2001 Mazzilli
6,341,523 B2 1/2002 Lynam
6,353,392 B1 3/2002 Schofield et al.
6,370,329 B1 4/2002 Teuchert
6,392,315 B1 5/2002 Jones et al.
6,396,397 B1 5/2002 Bos et al.
6,411,204 B1 6/2002 Bloomfield et al.
6,420,975 B1 7/2002 DeLine et al.
6,424,273 B1 7/2002 Gutta et al.
6,430,303 B1 8/2002 Naoi et al.
6,442,465 B2 8/2002 Breed et al.
6,477,464 B2 11/2002 McCarthy et al.
6,497,503 B1 12/2002 Dassanayake et al.
6,498,620 B2 12/2002 Schofield et al.
6,516,664 B2 2/2003 Lynam
6,523,964 B2 2/2003 Schofield et al.
6,534,884 B2 3/2003 Marcus et al.
6,539,306 B2 3/2003 Turnbull
6,547,133 B1 4/2003 Devries, Jr. et al.
6,553,130 B1 4/2003 Lemelson et al.
6,559,435 B2 5/2003 Schofield et al.
6,574,033 B1 6/2003 Chui et al.
6,589,625 B1 7/2003 Kothari et al.
6,594,583 B2 7/2003 Ogura et al.
6,611,202 B2 8/2003 Schofield et al.
6,611,610 B1 8/2003 Stam et al.
6,636,258 B2 10/2003 Strumolo
6,650,455 B2 11/2003 Miles
6,672,731 B2 1/2004 Schnell et al.
6,674,562 B1 1/2004 Miles
6,678,614 B2 1/2004 McCarthy et al.
6,680,792 B2 1/2004 Miles
6,690,268 B2 2/2004 Schofield et al.
6,700,605 B1 3/2004 Toyoda et al.
6,704,621 B1 3/2004 Stein et al.
6,710,908 B2 3/2004 Miles et al.
6,711,474 B1 3/2004 Treyz et al.
6,714,331 B2 3/2004 Lewis et al.
6,717,610 B1 4/2004 Bos et al.
6,735,506 B2 5/2004 Breed et al.
6,741,377 B2 5/2004 Miles
6,744,353 B2 6/2004 Sjonell
6,757,109 B2 6/2004 Bos
6,762,867 B2 7/2004 Lippert et al.
6,794,119 B2 9/2004 Miles
6,795,221 B1 9/2004 Urey
6,802,617 B2 10/2004 Schofield et al.
6,806,452 B2 10/2004 Bos et al.
6,819,231 B2 11/2004 Berberich et al.
6,822,563 B2 11/2004 Bos et al.
6,823,241 B2 11/2004 Shirato et al.
6,824,281 B2 11/2004 Schofield et al.
6,831,261 B2 12/2004 Schofield et al.
6,850,156 B2 2/2005 Bloomfield et al.
6,882,287 B2 4/2005 Schofield
6,889,161 B2 5/2005 Winner et al.
6,891,563 B2 5/2005 Schofield et al.
6,909,753 B2 6/2005 Meehan et al.
6,946,978 B2 9/2005 Schofield
6,953,253 B2 10/2005 Schofield et al.
6,968,736 B2 11/2005 Lynam
6,975,775 B2 12/2005 Rykowski et al.
6,989,736 B2 1/2006 Berberich et al.
7,004,606 B2 2/2006 Schofield
7,005,974 B2 2/2006 McMahon et al.
7,038,577 B2 5/2006 Pawlicki et al.
7,062,300 B1 6/2006 Kim
7,065,432 B2 6/2006 Moisel et al.
7,079,017 B2 7/2006 Lang et al.
7,085,637 B2 8/2006 Breed et al.
7,092,548 B2 8/2006 Laumeyer et al.
7,111,968 B2 9/2006 Bauer et al.
7,116,246 B2 10/2006 Winter et al.
7,123,168 B2 10/2006 Schofield
7,145,519 B2 12/2006 Takahashi et al.
7,149,613 B2 12/2006 Stam et al.
7,161,616 B1 1/2007 Okamoto et al.
7,167,796 B2 1/2007 Taylor et al.
7,195,381 B2 3/2007 Lynam et al.
7,202,776 B2 4/2007 Breed
7,205,904 B2 4/2007 Schofield
7,227,459 B2 6/2007 Bos et al.
7,227,611 B2 6/2007 Hull et al.
7,311,406 B2 12/2007 Schofield et al.
7,325,934 B2 2/2008 Schofield et al.
7,325,935 B2 2/2008 Schofield et al.
7,338,177 B2 3/2008 Lynam
7,339,149 B1 3/2008 Schofield et al.
7,344,261 B2 3/2008 Schofield et al.
7,355,524 B2 4/2008 Schofield
7,370,983 B2 5/2008 DeWind et al.
7,380,948 B2 6/2008 Schofield et al.
7,388,182 B2 6/2008 Schofield et al.
7,402,786 B2 7/2008 Schofield et al.
7,423,248 B2 9/2008 Schofield et al.
7,425,076 B2 9/2008 Schofield et al.
7,446,650 B2 11/2008 Scholfield et al.
7,459,664 B2 12/2008 Schofield et al.
7,460,951 B2 12/2008 Altan
7,480,149 B2 1/2009 DeWard et al.
7,490,007 B2 2/2009 Taylor et al.
7,492,281 B2 2/2009 Lynam et al.
7,516,010 B1 * 4/2009 Kaplan ................. G01C 21/30 701/426
7,526,103 B2 4/2009 Schofield et al.
7,561,181 B2 7/2009 Schofield et al.
7,581,859 B2 9/2009 Lynam
7,592,928 B2 9/2009 Chinomi et al.
7,616,781 B2 11/2009 Schofield et al.
7,619,508 B2 11/2009 Lynam et al.
7,639,149 B2 12/2009 Katoh
7,681,960 B2 3/2010 Wanke et al.
7,720,580 B2 5/2010 Higgins-Luthman
7,777,611 B2 8/2010 Desai
7,834,778 B2 * 11/2010 Browne ................. G08G 1/143 340/932.2
7,855,755 B2 12/2010 Weller et al.
7,859,565 B2 12/2010 Schofield et al.
7,881,496 B2 2/2011 Camilleri et al.
7,914,187 B2 3/2011 Higgins-Luthman et al.
7,965,336 B2 6/2011 Bingle et al.
8,013,780 B2 9/2011 Lynam
8,027,029 B2 9/2011 Lu et al.

(56) References Cited

U.S. PATENT DOCUMENTS 8,058,977 B2 11/2011 Lynam
8,340,866 B2 12/2012 Hanzawa et al.
8,466,806 B2 6/2013 Schofield
8,694,224 B2 4/2014 Chundrlik, Jr. et al.
8,849,495 B2 9/2014 Chundrik, Jr. et al.
10,222,224 B2 3/2019 Johnson et al.
2002/0015153 A1 2/2002 Downs
2002/0044065 A1 4/2002 Quist et al.
2002/0113873 A1 8/2002 Williams
2002/0159270 A1 10/2002 Lynam et al.
2003/0095039 A1 5/2003 Shimomura et al.
2003/0137586 A1 7/2003 Lewellen
2003/0222982 A1 12/2003 Hamdan et al.
2003/0227777 A1 12/2003 Schofield
2004/0012488 A1 1/2004 Schofield
2004/0016870 A1 1/2004 Pawlicki et al.
2004/0032321 A1 2/2004 McMahon et al.
2004/0051634 A1 3/2004 Schofield et al.
2004/0114381 A1 6/2004 Salmeen et al.
2004/0128065 A1 7/2004 Taylor et al.
2004/0200948 A1 10/2004 Bos et al.
2005/0078389 A1 4/2005 Kulas et al.
2005/0134966 A1 6/2005 Burgner
2005/0134983 A1 6/2005 Lynam
2005/0146792 A1 7/2005 Schofield et al.
2005/0169003 A1 8/2005 Lindahl et al.
2005/0195488 A1 9/2005 McCabe et al.
2005/0200700 A1 9/2005 Schofield et al.
2005/0232469 A1 10/2005 Schofield et al.
2005/0264891 A1 12/2005 Uken et al.
2006/0018511 A1 1/2006 Stam et al.
2006/0018512 A1 1/2006 Stam et al.
2006/0028731 A1 2/2006 Schofield et al.
2006/0050018 A1 3/2006 Hutzel et al.
2006/0061008 A1 3/2006 Karner et al.
2006/0091813 A1 5/2006 Stam et al.
2006/0103727 A1 5/2006 Tseng
2006/0164230 A1 7/2006 DeWind et al.
2006/0250501 A1 11/2006 Widmann et al.
2006/0290479 A1 12/2006 Akatsuka et al.
2007/0023613 A1 2/2007 Schofield et al.
2007/0040701 A1 2/2007 Browne et al.
2007/0104476 A1 5/2007 Yasutomi et al.
2007/0109406 A1 5/2007 Schofield et al.
2007/0109651 A1 5/2007 Schofield et al.
2007/0109652 A1 5/2007 Schofield et al.
2007/0109653 A1 5/2007 Schofield et al.
2007/0109654 A1 5/2007 Schofield et al.
2007/0120657 A1 5/2007 Schofield et al.
2007/0176080 A1 8/2007 Schofield et al.
2008/0048885 A1* 2/2008 Quinn .................... G08G 1/143 340/932.2
2008/0180529 A1 7/2008 Taylor et al.
2009/0113509 A1 4/2009 Tseng et al.
2009/0177347 A1 7/2009 Breuer et al.
2009/0243824 A1 10/2009 Peterson et al.
2009/0244361 A1 10/2009 Gebauer et al.
2009/0295181 A1 12/2009 Lawlor et al.
2010/0020170 A1 1/2010 Higgins-Luthman et al.
2010/0045797 A1 2/2010 Schofield et al.
2010/0085171 A1 4/2010 Do
2010/0097469 A1 4/2010 Blank et al.
2010/0228437 A1 9/2010 Hanzawa et al.
2011/0140922 A1* 6/2011 Levy ...................... G08G 1/144 340/932.2
2012/0056758 A1 3/2012 Kuhlman et al.
2012/0062743 A1 3/2012 Lynam et al.
2012/0200430 A1 8/2012 Spahl
2012/0218412 A1 8/2012 Dellantoni et al.
2012/0245817 A1 9/2012 Cooprider et al.
2012/0262340 A1 10/2012 Hassan et al.
2012/0303222 A1 11/2012 Cooprider et al.
2013/0124052 A1 5/2013 Hahne
2013/0131918 A1 5/2013 Hahne
2013/0222592 A1 8/2013 Gieseke
2013/0231825 A1 9/2013 Chundrlik, Jr. et al.
2013/0342333 A1 12/2013 Hutchings
2014/0058711 A1* 2/2014 Scofield ................. G06Q 10/04 703/6
2014/0067206 A1 3/2014 Pflug
2014/0156183 A1 6/2014 Windeler et al.
2014/0218529 A1 8/2014 Mahmoud et al.
2014/0266800 A1* 9/2014 Koukoumidis ........ G08G 1/141 340/932.2
2014/0285361 A1* 9/2014 Tippelhofer ........... G08G 1/143 340/932.2
2014/0309884 A1 10/2014 Wolf

* cited by examiner

FIG. 4

VEHICULAR PARKING ASSIST SYSTEM THAT DETERMINES A PARKING SPACE BASED IN PART ON PREVIOUSLY PARKED SPACES

CROSS REFERENCE TO RELATED APPLICATIONS

The present application is a continuation of U.S. patent application Ser. No. 15/130,130, filed Apr. 15, 2016, now U.S. Pat. No. 10,222,224, which is a division of U.S. patent application Ser. No. 14/303,695, filed Jun. 13, 2014, which claims the filing benefits of U.S. provisional application, Ser. No. 61/838,619, filed Jun. 24, 2013, which is hereby incorporated herein by reference in its entirety.

FIELD OF THE INVENTION

The present invention relates generally to a system for a vehicle and, more particularly, to a vehicle system that utilizes one or more sensors at a vehicle to determine the location of the vehicle and/or an action at the vehicle.

BACKGROUND OF THE INVENTION

Use of sensors, such as imaging sensors, in vehicle systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a parking assist system and/or an alert system for a vehicle that may utilize one or more cameras (preferably one or more CMOS cameras) to capture image data representative of images exterior of the vehicle. The system may comprise a parking assist function that, responsive to a determination of a current geographical location of the vehicle, provides information pertaining to nearby parking lots and available parking spaces to the driver of the vehicle. The system may comprise a security function or alert function that, responsive to a determination of a potential criminal act or break in at the vehicle, generates an alert communication to other nearby vehicles and/or to the vehicle owner and/or to the local authorities, whereby the alarm systems and/or cameras of the nearby vehicles may be actuated in response to receipt of the alert communication.

These and other objects, advantages, purposes and features of the present invention will become apparent upon review of the following specification in conjunction with the drawings.

BRIEF DESCRIPTION OF THE DRAWINGS

FIG. 4 is a schematic of the events that occur when the security system of the present invention detects a crime.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
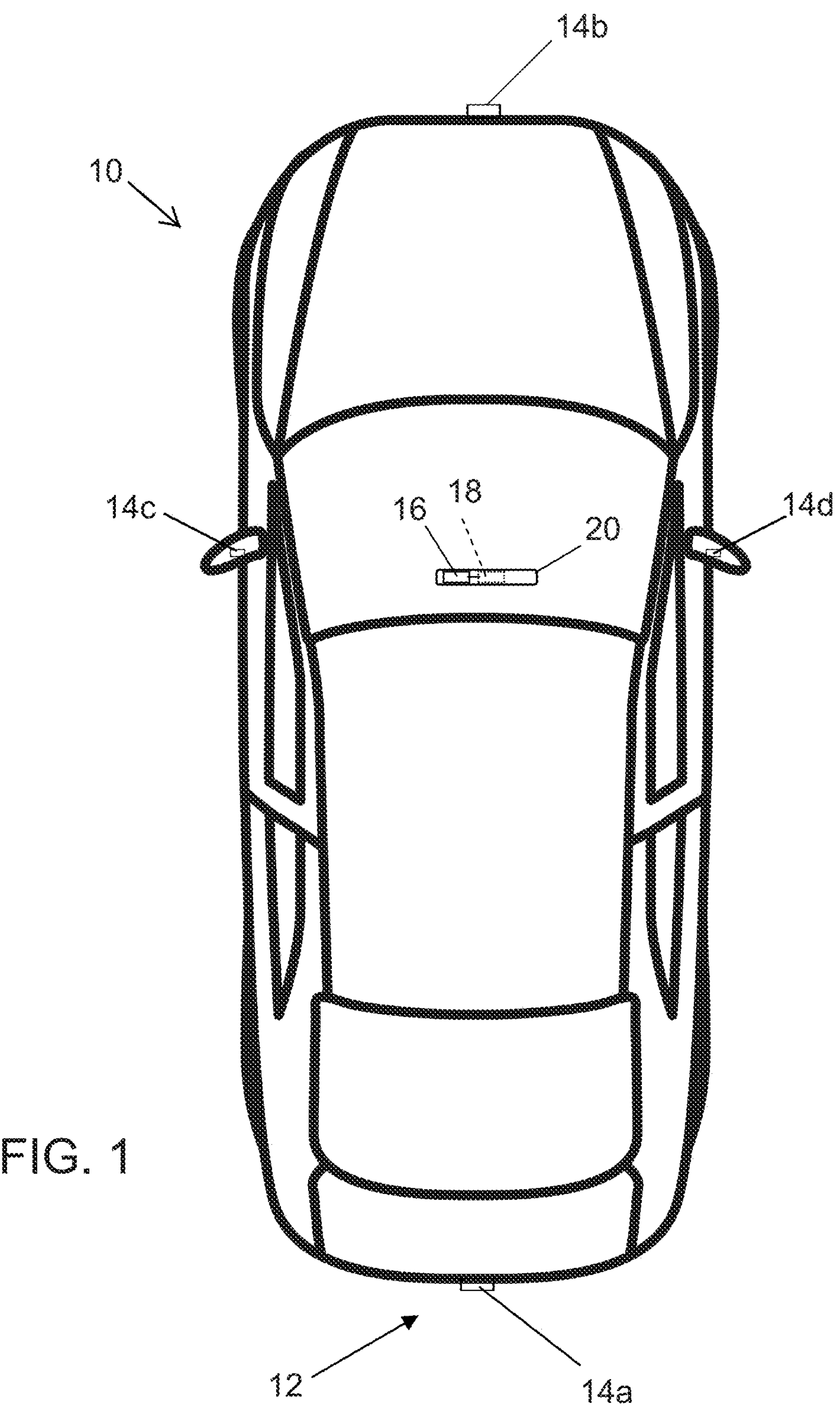
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14*a* (and the system may optionally include multiple exterior facing imaging sensors or cameras, such as a forwardly facing camera 14*b* at the front (or at the windshield) of the vehicle, and a sidewardly/rearwardly facing camera 14*c*, 14*d* at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Navigation/Networked Smart Park:

The present invention provides a parking assist system or smart park system that is operable to assist the driver of a vehicle equipped with the parking assist system to find a parking space at or near the current location of the equipped vehicle. Such a system may empower or enable the vehicle system (which preferably includes a display to display the various found parking space locations to the driver) to assist the driver in finding an urban parking space.

Typically, a driver must circle through a city until he or she is lucky enough to find an available parking spot. This often can be very time consuming and frustrating to the driver of the vehicle. The system of the present invention avoids such frustration by, such as responsive to a user input (such as a button or switch or voice command or the like), displaying or otherwise conveying to the driver where a nearby parking space or spaces may be located.

The parking assist system of the present invention uses sensors and a networked database to make this process more efficient. For example, the system may, with the inclusion of a navigation system, such as a GPS or the like (such as an output of a navigation system that is indicative of the current location of the vehicle), the parking assist system can record the parking space or lot locations that were previously used by the driver or vehicle or system (such as where the vehicle was parked a previous time or several times that the parking assist system was used or actuated). Optionally, with the inclusion of sensor(s), such as a rear or front-facing camera, that are operable to detect other parked vehicles, the system can record the frequency of parked cars in an area, and thus may determine or estimate the likelihood of finding an empty space or may provide a hierarchy of potential parking spaces in an order of likely availability.

Optionally, with the inclusion of a wireless network, such as 802.11p network or the like, a database within the vehicle or at a remote server can record any other nearby vehicles that have recently used the parking assist system (such as other vehicles similarly equipped with the parking assist system of the present invention or the like) and share this to the parking assist system of the subject vehicle and other similar parking assist systems. If Internet access is available, available parking spaces or lots can be cross referenced with all other data (and the location of available spaces may be communicated to the driver of the vehicle to further enhance the driver's ability to readily find an available parking space).

Figure 2:
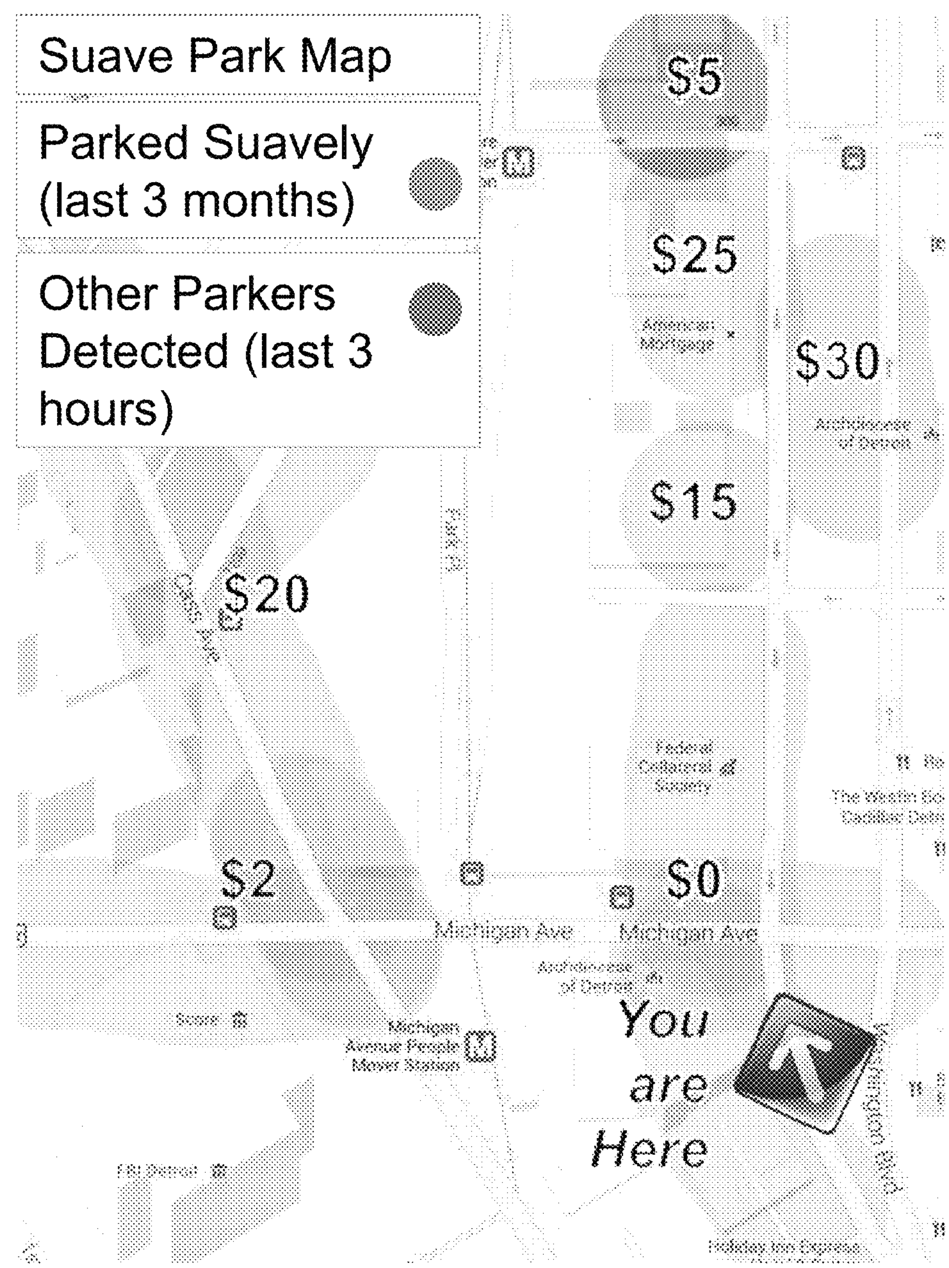
FIG. 2 is an image displayed to a driver of a vehicle equipped with a parking assist system of the present invention.

As shown in FIG. 2, the display may display a map image showing the current location of the equipped vehicle and various parking lots at or near a threshold distance of the vehicle. In the illustrated embodiment, the displayed image shows the parking spaces ahead of the vehicle in the current direction of travel of the vehicle, but the display may (such as responsive to a user input or selection) display parking spaces behind the vehicle or in any direction relative to the vehicle.

Optionally, and such as shown in FIG. 2, the display may highlight the parking spaces in accordance with prior parking data or other vehicle parking data. For example, the system may display locations where the driver of the subject vehicle has previously parked (such as where the equipped vehicle was parked over the previous three months or any other suitable prior time period). Optionally, the system may receive data from other parking assist systems and/or a remote server, and may display parking locations that have been previously used by other vehicles, such as by other vehicles similarly equipped with a parking assist system of the present invention. The highlighting of the historic parking data for the equipped or subject vehicle may be displayed as a different color than the highlighting of the historic or current parking data of other similarly equipped vehicles. Optionally, the displayed image may include the price for parking at the displayed locations so that the driver can make a decision as to which lot may be preferred based on the relative location of the parking lot or space to the equipped vehicle and cost to park at that parking lot or space.

Optionally, for parking lots that are full, the parking assist system may receive a communication to that effect and may remove that parking lot or structure from the display or display that parking lot or structure as unavailable. It is envisioned that, in areas that use automated parking meters, that information provided by such systems may be received by the parking assist system of the present invention, and currently available street side parking spaces may also be displayed to the driver of the equipped vehicle (optionally such parking space availability information or data may be derived from images captured by traffic cameras or building security cameras and/or the like). Any of the above information can be displayed to the driver on command (or optionally may be automatically displayed in response to the type of driving by the driver when the driving behavior is indicative of someone looking for a parking space).

Figure 3:
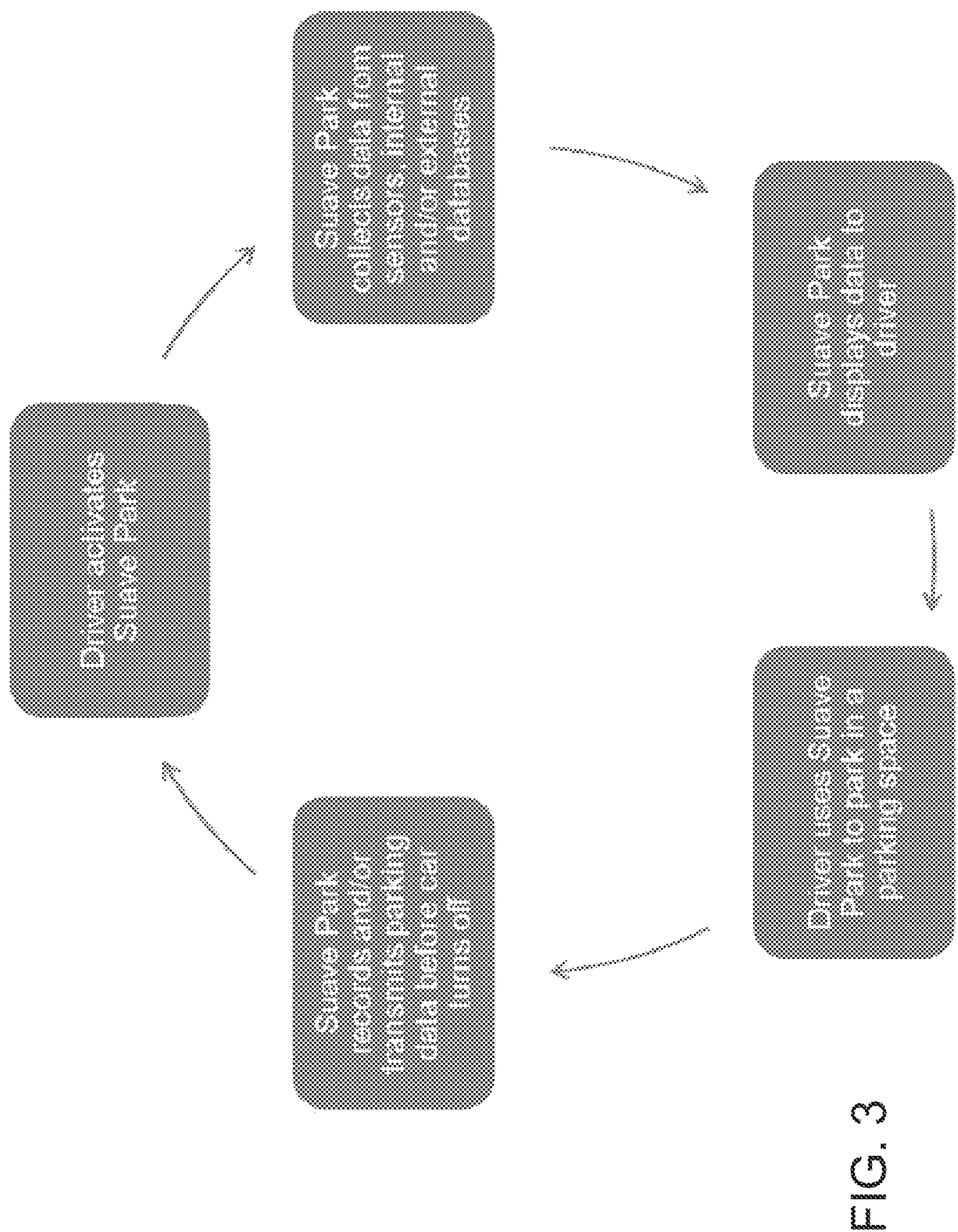
FIG. 3 is a flow chart of the process steps of the parking assist system of the present invention.

Thus, and with reference to FIG. 3, when a driver activates the parking assist system of the present invention, the system collects data from vehicle sensors (such as cameras or the like), sensors external of the vehicle (such as traffic cameras or the like), internal databases of the vehicle or parking assist system, and/or external databases (such as provided or accessed via a telematics system of the vehicle and/or a remote server connection or the like). The parking assist system then displays the nearby and/or available parking lots to the driver of the equipped vehicle. The driver then may select a preferred or nearby location and park in an available space at the selected location. The parking assist system may record the parked location (such as for future reference) and/or may transmit the parking data (such as for use by other vehicles equipped with parking assist systems) before the vehicle is turned off.

The parking system may utilize aspects of the systems described in U.S. provisional application Ser. No. 62/006,391, filed Jun. 2, 2014, and/or U.S. patent application Ser. No. 14/169,329, filed Jan. 31, 2014 and published Aug. 7, 2014 as U.S. Publication No. US-2014-0218529, Ser. No. 13/660,306, filed Oct. 25, 2012, now U.S. Pat. No. 9,146,898, and/or International Publication No. WO 2013/109869, which are all hereby incorporated herein by reference in their entireties.

Networked Alarm and Tracking:

The present invention also provides a security or alert system that detects a vehicle break in or other action at the vehicle (such as when the vehicle is parked) and provides a communication or alert to one or more of the owner of the vehicle, systems of other vehicles, local authorities and/or the like. The security system is particularly suited for networked vehicles to enhance the response to intrusion and vandalism of one of the networked vehicles.

Currently, if a criminal acts on a vehicle, then only the electronics or systems or accessories that are in the acted-on vehicle itself may sound an alarm or attempt to record the perpetrator. There may not be any nearby security cameras. The present invention provides for automatic communication of the detected criminal act to other vehicles and/or systems to enhance the alert and/or detection of the criminal act.

The security system of the present invention may use a communication network, such as a wireless communication network, to communicate data pertaining to the detection of a break-in or impact or the like at the equipped vehicle. With the inclusion of a wireless network, systems of nearby vehicles can respond to criminal acts as well. For example, responsive to receipt of a communication derived from the vehicle that is acted on (such as a detection of a vehicle break in or impact at the vehicle or the like), systems of nearby vehicles may sound the respective vehicle alarms, and/or may lock the respective vehicle doors. Such responses are suited for other nearby parked vehicles, which may have their respective security systems running in a sleep mode until the communication from the other system(s) is/are received.

Optionally, responsive to receipt of a communication derived from the vehicle that is acted on, the drivers of nearby similarly equipped vehicles may be alerted as to the where the crime is occurring. Optionally, with the inclusion of internet access or other wireless communication links, the owner of the acted on vehicle may be notified (such as via a text message or automated phone call to the owner's cell phone or the like) and/or the local authorities may be alerted to the occurrence of the detected act. Optionally, responsive to receipt of a communication derived from the vehicle that is acted on, the vision systems of nearby vehicles may activate their sensor or sensors, such as surround-view cameras or the like, to capture image data at and around the nearby vehicles, whereby the captured image data may be recorded by the systems of the nearby vehicles and/or may be transmitted by the systems of the nearby vehicles (such as to the system of the acted on vehicle for future reference or such as to a remote server or such as to the local authorities or the like).

Figure 5:
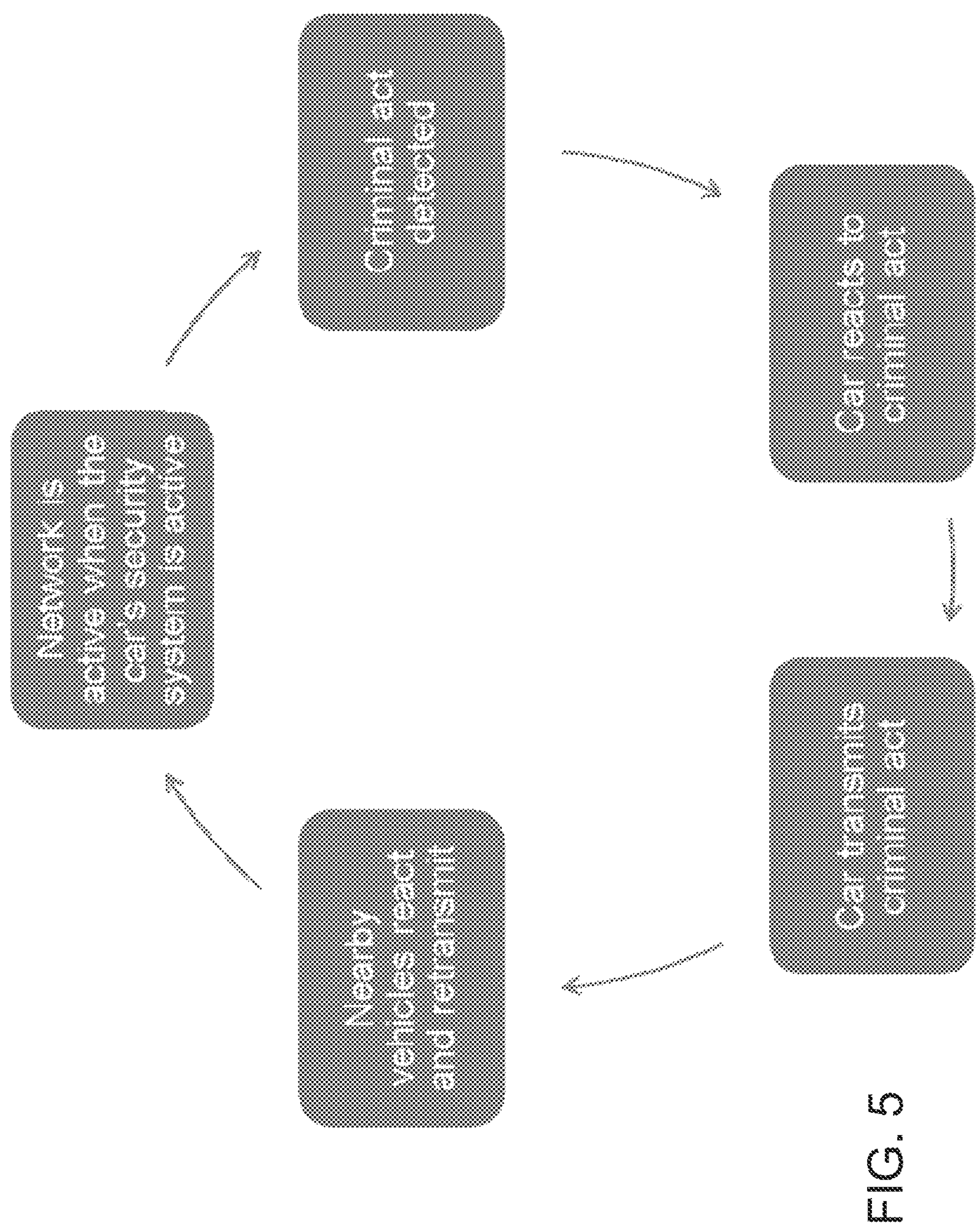
FIG. 5 is a flow chart of the process steps of the security system of the present invention.

As can be seen with reference to FIGS. 4 and 5, when the equipped or subject vehicle is parked, the vehicle's security system is active and the communication network for the security system is also active. When a criminal act is detected (or a potential criminal act that the system determines is indicative of a break in or vandalism or collision impact at the subject vehicle), the subject vehicle reacts to the determined act. For example, the subject vehicle's system or systems may capture image data of the surrounding area and/or interior cabin of the vehicle and/or may activate the vehicle alarm system (such as by utilizing aspects of the systems described in U.S. patent application Ser. No. 14/169,329, filed Jan. 31, 2014 and published Aug. 7, 2014 as U.S. Publication No. US-2014-0218529, which is hereby incorporated herein by reference in its entirety). The security system of the subject or acted on vehicle also transmits data or information pertaining to the determined act, such as via a wireless communication that may be received by nearby vehicles (such as via a short range wireless communication protocol) and/or by a remote server and/or the local authorities or the like (such as via a long range wireless communication or internet connection or cellular or satellite communication or the like). Responsive to receipt of such data or information, other systems of nearby vehicles react and may transmit additional data or information (such as video images or the like) and/or may retransmit the received data or information to other nearby vehicles (such as vehicles that may have been out of a short range transmission of the subject or acted on vehicle but within range of the short range transmission by the nearby vehicle). Also, responsive to receipt of such data or information, other nearby camera systems may be activated (such as building security cameras or the like) and/or the local authorities may be notified of the potential criminal act and/or the owner of the vehicle may be notified of the potential criminal act.

Thus, the present invention provides a security system that, responsive to a detection of a potential break in at a parked equipped vehicle, may alert other nearby vehicles and/or the vehicle owner and/or the local authorities of the break in. The other vehicle systems may then generate alarms or lock their doors or the like to deter the perpetrator from future action, and/or the other vehicle systems may actuate their cameras or sensors to enhance image capture of the nearby area to assist the authorities in identifying the perpetrator. The present invention thus, responsive to such a detection, causes other nearby vehicles to react accordingly to mitigate the criminal threat. This is similar or analogous to how a bee sting leaves a banana-like odor which compels other bees to react against a threat.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/359,341, filed May 20, 2014, and published Nov. 20, 2014 as U.S. Publication No. US-2014-0340510; Ser. No. 14/359,340, filed May 20, 2014, and published Oct. 23, 2014 as U.S. Publication No. US-2014-0313339; Ser. No. 14/282,029, filed May 20, 02014, now U.S. Pat. No. 9,205,776; Ser. No. 14/282,028, filed May 20, 2014 and published Nov. 27, 2014 as U.S. Publication No. US-2014-0347486; Ser. No. 14/358,232, filed May 15, 2014 and published Oct. 30, 2014 as U.S. Publication No. US-2014-0320658; Ser. No. 14/272,834, filed May 8, 2014, now U.S. Pat. No. 9,280,202; Ser. No. 14/356,330, filed May 5, 2014 and published Oct. 16, 2014 as U.S. Publication No. US-2014-0307095; Ser. No. 14/269,788, filed May 5, 2014 and published Nov. 6, 2014 as U.S. Publication No. US-2014-0327774; Ser. No. 14/268,169, filed May 2, 2014 and published Nov. 6, 2014 as U.S. Publication No. US-2014-0327772; Ser. No. 14/264,443, filed Apr. 29, 2014 and published Oct. 30, 2014 as U.S. Publication No. US-2014-0320636; Ser. No. 14/354,675, filed Apr. 28, 2014 and published Oct. 2, 2014 as U.S. Publication No. US-2014-0293057; Ser. No. 14/248,602, filed Apr. 9, 2014 and published Oct. 16, 2014 as U.S. Publication No. US-2014-0309884; Ser. No. 14/242,038, filed Apr. 1, 2014 and published Aug. 14, 2014 as U.S. Publication No. US-2014-0226012; Ser. No. 14/229,061, filed Mar. 28, 2014 and published Oct. 2, 2014 as U.S. Publication No. US-2014-0293042; Ser. No. 14/343,937, filed Mar. 10, 2014 and published Aug. 21, 2014 as U.S. Publication No. US-2014-0232872; Ser. No. 14/343,936, filed Mar. 10, 2014 and published Aug. 7, 2014 as U.S. Publication No. US-2014-0218535; Ser. No. 14/195,135, filed Mar. 3, 2014 and published Sep. 4, 2014 as U.S. Publication No. US-2014-0247354; Ser. No. 14/195,136, filed Mar. 3, 2014 and published Sep. 4, 2014 as U.S. Publication No. US-2014-0247355; Ser. No. 14/191,512, filed Feb. 27, 2014 and published Sep. 4, 2014 as U.S. Publication No. US-2014-0247352; Ser. No. 14/183,613, filed Feb. 19, 2014 and published Aug. 21, 2014 as U.S. Publication No. US-2014-0232869; Ser. No. 14/169,329, filed Jan. 31, 2014 and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014 and published Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013 and published Jun. 12, 2014 as U.S. Publication No. US-2014-0160276; Ser. No. 14/102,980, filed Dec. 11, 2013 and published Jun. 19, 2014 as U.S. Publication No. US-2014-0168437; Ser. No. 14/098,817, filed Dec. 6, 2013 and published Jun. 19, 2014 as U.S. Publication No. US-2014-0168415; Ser. No. 14/097,581, filed Dec. 5, 2013 and published Jun. 12, 2014 as U.S. Publication No. US-2014-0160291; Ser. No. 14/093,981, filed Dec. 2, 2013, now U.S. Pat. No. 8,917,169; Ser. No. 14/093,980, filed Dec. 2, 2013 and published Jun. 5, 2014 as U.S. Publication No. US-2014-0152825; Ser. No. 14/082, 573, filed Nov. 18, 2013 and published May 22, 2014 as U.S. Publication No. US-2014-0139676; Ser. No. 14/082,574, filed Nov. 18, 2013, now U.S. Pat. No. 9,307,640; Ser. No. 14/082,575, filed Nov. 18, 2013, now U.S. Pat. No. 9,090, 234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. US-2014-0104426; Ser. No. 14/046,174, filed Oct. 4, 2013 and published Apr. 10, 2014 as U.S. Publication No. US-2014-0098229; Ser. No. 14/036,723, filed Sep. 25, 2013 and published Mar. 27, 2014 as U.S. Publication No. US-2014-0085472; Ser. No. 14/016,790, filed Sep. 3, 2013 and published Mar. 6, 2014 as U.S. Publication No. US-2014-0067206; Ser. No. 14/001,272, filed Aug. 23, 2013, now U.S. Pat. No. 9,233,641; Ser. No. 13/970,868, filed Aug. 20, 2013 and published Feb. 20, 2014 as U.S. Publication No. US-2014-0049646; Ser. No. 13/964, 134, filed Aug. 12, 2013 and published Feb. 20, 2014 as U.S. Publication No. US-2014-0052340; Ser. No. 13/942,758, filed Jul. 16, 2013 and published Jan. 23, 2014 as U.S. Publication No. US-2014-0025240; Ser. No. 13/942,753, filed Jul. 16, 2013 and published Jan. 30, 2014 as U.S. Publication No. US-2014-0028852; Ser. No. 13/927,680, filed Jun. 26, 2013 and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013 and published Nov. 28, 2013 as U.S. Publication No. US-2013-0314503; Ser. No. 13/887, 724, filed May 6, 2013 and published Nov. 14, 2013 as U.S. Publication No. US-2013-0298866; Ser. No. 13/852,190, filed Mar. 28, 2013 and published Aug. 29, 2013 as U.S. Publication No. US-2013-0222593; Ser. No. 13/851,378, filed Mar. 27, 2013, now U.S. Pat. No. 9,319,637; Ser. No. 13/848,796, filed Mar. 22, 2012 and published Oct. 24, 2013 as U.S. Publication No. US-2013-0278769; Ser. No. 13/847, 815, filed Mar. 20, 2013 and published Oct. 31, 2013 as U.S. Publication No. US-2013-0286193; Ser. No. 13/800,697, filed Mar. 13, 2013 and published Oct. 3, 2013 as U.S. Publication No. US-2013-0258077; Ser. No. 13/785,099, filed Mar. 5, 2013 and published Sep. 19, 2013 as U.S. Publication No. US-2013-0242099; Ser. No. 13/779,881, filed Feb. 28, 2013, now U.S. Pat. No. 8,694,224; Ser. No. 13/774,317, filed Feb. 22, 2013, now U.S. Pat. No. 9,269, 263; Ser. No. 13/774,315, filed Feb. 22, 2013 and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534, 657, filed Jun. 27, 2012 and published Jan. 3, 2013 as U.S. Publication No. US-2013-0002873, and/or U.S. provisional applications, Ser. No. 62/001,796, filed May 22, 2014; Ser. No. 62/001,796, filed May 22, 2014; Ser. No. 61/993,736, filed May 15, 2014; Ser. 61/991,810, filed May 12, 2014; Ser. No. 61/991,809, filed May 12, 2014; Ser. No. 61/990, 927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972, 707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941, 568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No.

61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; and/or Ser. No. 61/830,377, filed Jun. 3, 2013; which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. Publication No. US-2006-0061008 and/or U.S. patent application Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular parking assist system, said vehicular parking assist system comprising:

a location sensor disposed at a vehicle equipped with said vehicular parking assist system, wherein said location sensor at least in part determines a current geographical location of the equipped vehicle;

an electronic control unit (ECU) disposed at the equipped vehicle;

wherein said ECU stores a database of parking space locations where the equipped vehicle has previously been parked;

wherein said vehicular parking assist system receives wireless communications from a remote server pertaining to parking spaces at or near the current geographical location of the equipped vehicle; and wherein, responsive at least in part to at least one selected from the group consisting of (i) an output of said location sensor, (ii) the stored database of parking space locations where the equipped vehicle has previously been parked and (iii) the received wireless communications from the remote server, said vehicular parking assist system determines a likelihood of finding an empty parking space at or near the current geographical location of the equipped vehicle.

2. The vehicular parking assist system of claim 1, wherein said vehicular parking assist system ranks potential parking spaces in order of likely availability.

3. The vehicular parking assist system of claim 1, wherein said location sensor comprises a vision system of the equipped vehicle, the vision system comprising at least one camera having a field of view exterior of the equipped vehicle.

4. The vehicular parking assist system of claim 1, wherein said location sensor comprises a component of a global positioning system.

5. The vehicular parking assist system of claim 1, wherein said vehicular parking assist system receives wireless communications pertaining to parking behavior of other vehicles at or near the current geographical location of the equipped vehicle.

6. The vehicular parking assist system of claim 1, wherein said vehicular parking assist system receives wireless communications pertaining to prices for parking at parking spaces at or near the current geographical location of the equipped vehicle.

7. The vehicular parking assist system of claim 1, comprising a user input that is actuatable by an occupant of the equipped vehicle, and wherein, responsive to actuation of the user input, said vehicular parking assist system determines the likelihood of finding an empty parking space at or near the current geographical location of the equipped vehicle.

8. The vehicular parking assist system of claim 1, wherein said vehicular parking assist system provides a map of an area surrounding the equipped vehicle that highlights parking space locations where the equipped vehicle has previously been parked.

9. The vehicular parking assist system of claim 8, wherein said vehicular parking assist system receives wireless communications pertaining to locations of parking spaces where other vehicles have previously been parked.

10. The vehicular parking assist system of claim 9, wherein the provided map highlights the locations of parking spaces where other vehicles have previously been parked.

11. The vehicular parking assist system of claim 10, wherein the provided map highlights the parking space locations where the equipped vehicle has previously been parked differently than the highlighting of the locations of parking spaces where other vehicles have previously been parked.

12. The vehicular parking assist system of claim 10, wherein said vehicular parking assist system receives wireless communications pertaining to parking fees associated with the highlighted locations.

13. The vehicular parking assist system of claim 1, wherein said vehicular parking assist system transmits parking information pertaining to where the equipped vehicle has parked to a remote server for use by other vehicles.

14. The vehicular parking assist system of claim 1, wherein said vehicular parking assist system receives wireless communications pertaining to a density of parked vehicles in an area at or near the current geographical location of the equipped vehicle, and wherein said vehicular parking assist system determines the likelihood of finding an empty parking space in that area based at least in part on the wireless communications pertaining to the density of parked vehicles.

15. The vehicular parking assist system of claim 1, wherein said vehicular parking assist system determines the likelihood of finding an empty parking space at or near the current geographical location of the equipped vehicle responsive at least in part to at least two selected from the group consisting of (i) an output of said location sensor, (ii) the stored database of parking space locations where the equipped vehicle has previously been parked and (iii) the received wireless communications from the remote server.

16. The vehicular parking assist system of claim 1, wherein said vehicular parking assist system determines the likelihood of finding an empty parking space at or near the current geographical location of the equipped vehicle responsive at least in part to (i) an output of said location sensor, (ii) the stored database of parking space locations where the equipped vehicle has previously been parked and (iii) the received wireless communications from the remote server.

17. A vehicular parking assist system, said vehicular parking assist system comprising:

a location sensor disposed at a vehicle equipped with said vehicular parking assist system, wherein said location sensor at least in part determines a current geographical location of the equipped vehicle;

wherein said location sensor comprises one selected from the group consisting of (i) a vision system of the equipped vehicle, the vision system comprising at least one camera having a field of view exterior of the equipped vehicle, and (ii) a global positioning system;

an electronic control unit (ECU) disposed at the equipped vehicle;

wherein said ECU stores a database of parking space locations where the equipped vehicle has previously been parked;

wherein said vehicular parking assist system receives wireless communications from a remote server pertaining to parking spaces at or near the current geographical location of the equipped vehicle;

wherein, responsive at least in part to at least one selected from the group consisting of (i) an output of said location sensor, (ii) the stored database of parking space locations where the equipped vehicle has previously been parked and (iii) the received wireless communications from the remote server, said vehicular parking assist system determines a likelihood of finding an empty parking space at or near the current geographical location of the equipped vehicle; and wherein said vehicular parking assist system ranks potential parking spaces in order of likely availability.

18. The vehicular parking assist system of claim 17, wherein said vehicular parking assist system receives wireless communications pertaining to parking behavior of other vehicles at or near the current geographical location of the equipped vehicle.

19. The vehicular parking assist system of claim 17, wherein said vehicular parking assist system receives wireless communications pertaining to prices for parking at parking spaces at or near the current geographical location of the equipped vehicle.

20. The vehicular parking assist system of claim 17, comprising a user input that is actuatable by an occupant of the equipped vehicle, and wherein, responsive to actuation of the user input, said vehicular parking assist system determines the likelihood of finding an empty parking space at or near the current geographical location of the equipped vehicle.

21. The vehicular parking assist system of claim 17, wherein said vehicular parking assist system provides a map of an area surrounding the equipped vehicle that highlights parking space locations where the equipped vehicle has previously been parked.

22. The vehicular parking assist system of claim 17, wherein said vehicular parking assist system determines the likelihood of finding an empty parking space at or near the current geographical location of the equipped vehicle responsive at least in part to at least two selected from the group consisting of (i) an output of said location sensor, (ii) the stored database of parking space locations where the equipped vehicle has previously been parked and (iii) the received wireless communications from the remote server.

23. The vehicular parking assist system of claim 17, wherein said vehicular parking assist system determines the likelihood of finding an empty parking space at or near the current geographical location of the equipped vehicle responsive at least in part to (i) an output of said location sensor, (ii) the stored database of parking space locations where the equipped vehicle has previously been parked and (iii) the received wireless communications from the remote server.

24. A vehicular parking assist system, said vehicular parking assist system comprising:

a location sensor disposed at a vehicle equipped with said vehicular parking assist system, wherein said location sensor at least in part determines a current geographical location of the equipped vehicle;

wherein said location sensor comprises one selected from the group consisting of (i) a vision system of the equipped vehicle, the vision system comprising at least one camera having a field of view exterior of the equipped vehicle, and (ii) a global positioning system;

an electronic control unit (ECU) disposed at the equipped vehicle;

wherein said ECU stores a database of parking space locations where the equipped vehicle has previously been parked;

wherein said vehicular parking assist system receives wireless communications from a remote server pertaining to parking spaces at or near the current geographical location of the equipped vehicle;

wherein, responsive at least in part to at least one selected from the group consisting of (i) an output of said location sensor, (ii) the stored database of parking space locations where the equipped vehicle has previously been parked and (iii) the received wireless communications from the remote server, said vehicular parking assist system determines a likelihood of finding an empty parking space at or near the current geographical location of the equipped vehicle; and wherein said vehicular parking assist system transmits parking information pertaining to where the equipped vehicle has parked to a remote server for use by other vehicles.

25. The vehicular parking assist system of claim 24, wherein said vehicular parking assist system receives wireless communications pertaining to parking behavior of other vehicles at or near the current geographical location of the equipped vehicle.

26. The vehicular parking assist system of claim 24, wherein said vehicular parking assist system receives wireless communications pertaining to prices for parking at parking spaces at or near the current geographical location of the equipped vehicle.

27. The vehicular parking assist system of claim 24, comprising a user input that is actuatable by an occupant of the equipped vehicle, and wherein, responsive to actuation of the user input, said vehicular parking assist system determines the likelihood of finding an empty parking space at or near the current geographical location of the equipped vehicle.

28. The vehicular parking assist system of claim 24, wherein said vehicular parking assist system provides a map of an area surrounding the equipped vehicle that highlights parking space locations where the equipped vehicle has previously been parked.

29. The vehicular parking assist system of claim 24, wherein said vehicular parking assist system determines the likelihood of finding an empty parking space at or near the current geographical location of the equipped vehicle responsive at least in part to at least two selected from the group consisting of (i) an output of said location sensor, (ii) the stored database of parking space locations where the equipped vehicle has previously been parked and (iii) the received wireless communications from the remote server.

30. The vehicular parking assist system of claim 24, wherein said vehicular parking assist system determines the likelihood of finding an empty parking space at or near the current geographical location of the equipped vehicle responsive at least in part to (i) an output of said location sensor, (ii) the stored database of parking space locations where the equipped vehicle has previously been parked and (iii) the received wireless communications from the remote server.

* * * * *